J. W. OBERHOLTZER & C. E. WILCOX.
DROPPING-ATTACHMENTS FOR CORN-PLANTERS.
No. 195,528. Patented Sept. 25, 1877.
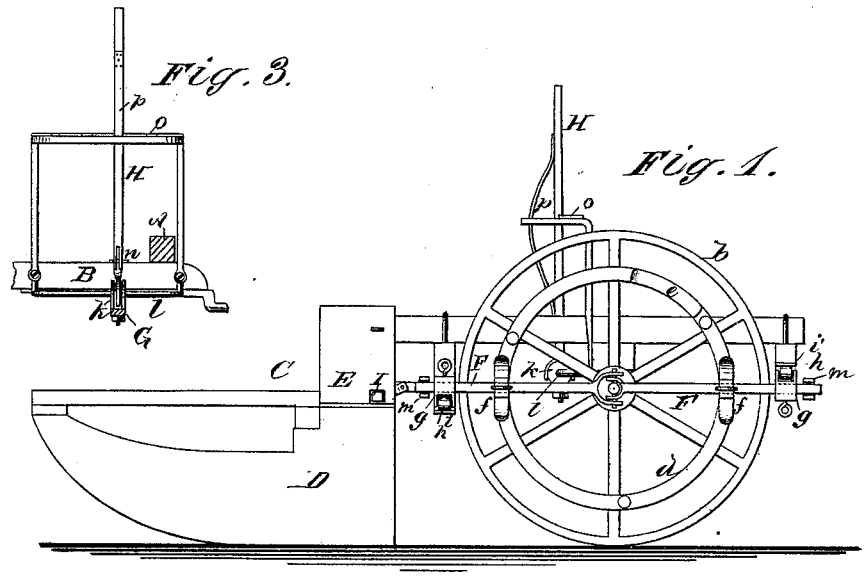
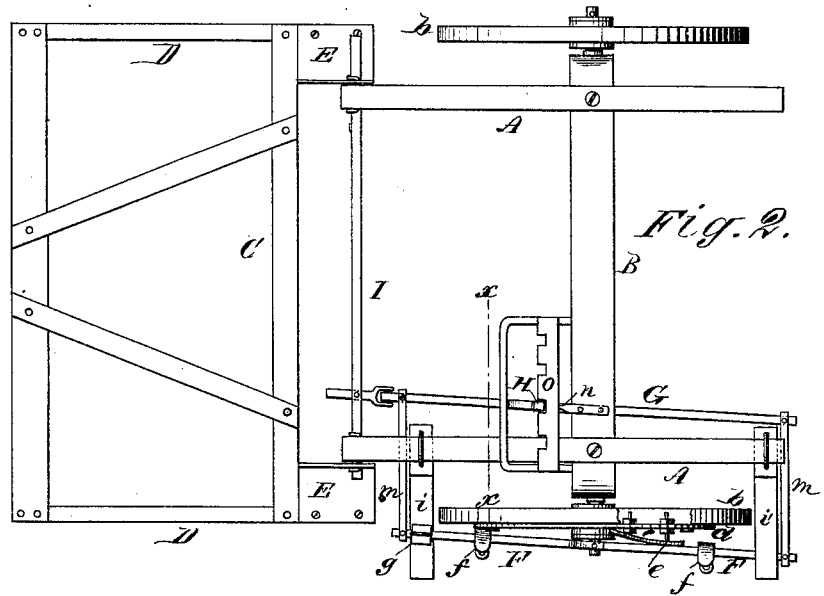
WITNESSES:
H. Rydquist
J. H. Scarborough
INVENTORS
J. W. Oberholtzer
C. E. Wilcox
BY Munn & Co
ATTORNEYS.

UNITED STATES PATENT OFFICE.

JACOB W. OBERHOLTZER AND CHARLES E. WILCOX, OF HIAWATHA, KANS.

IMPROVEMENT IN DROPPING ATTACHMENTS FOR CORN-PLANTERS.

Specification forming part of Letters Patent No. 195,528, dated September 25, 1877; application filed July 13, 1877.

*To all whom it may concern:*

Be it known that we, JACOB W. OBERHOLTZER, of Hiawatha, in the county of Brown and State of Kansas, and CHARLES E. WILCOX, of same place, have invented a new and Improved Dropping Attachment for Corn-Planters, of which the following is a specification:

Figure 1 is a side elevation. Fig. 2 is a plan view. Fig. 3 is a front view of the regulating-lever.

Similar letters of reference indicate corresponding parts.

The object of my invention is to provide an attachment to corn-planters that will mark the rows and drop the corn simultaneously.

In the drawings, A is a frame supported by the axle B, upon which wheels $b$ are placed. To the front of the frame A a frame, C, is hinged, that carries two runners or markers, D, and also seed-boxes at E. To one of the wheels $b$ a circle, $d$, is secured, to which one or more cams, $e$, are attached. In the present case but one is shown. F F are bars separately jointed to the end of the axle B, and provided with shoes $f$, which are placed so as to be engaged by the cam $e$ on the circle $d$. Upon the bars F, near their ends, blocks $g$ are placed, in which rollers $h$ are journaled, that run upon arms $i$ $i'$ that project from the frame A. The roller at the front of the machine runs upon the upper surface of the arm $i$, and the roller at the rear of the machine runs upon the under surface of the arm $i'$. G is a lever pivoted to a block, K, that slides upon a rod, $l$. This lever is connected with the bars F F by rods $m$, so that the motion of the said bar is communicated to the lever G. H is a lever that is fulcrumed at $n$, and is forked to engage with a slot in the block K. The upper end of the said lever is engaged by a notched bar, $o$, that holds the lever in any desired position, it being thrown into the notches of the said bar by the spring $p$.

By means of the lever H the lever G is moved toward or away from the wheel $b$, and the bars E F are moved so that their shoes $f$ are moved a greater or less distance by the cam $e$.

The lever G is connected with the seed-valve bar I, which it moves so as to drop the seed at the proper instant.

The apparatus is used by making a mark across the ends of the field and starting the dropping in the mark at each end of the field. Uniformity in the rows is thus secured.

Having thus described our invention, we claim as new and desire to secure by Letters Patent—

1. The combination, in a corn-dropper, of the circle $d$, carrying a cam, $e$, the bars F, having shoes $f$, the lever G, and seed-valve bar I, substantially as shown and described.

2. The blocks $g$, rollers $h$, and arms $i$ $i'$, in combination with the bars F, substantially as shown and described.

JACOB W. OBERHOLTZER.
CHARLES E. WILCOX.

Witnesses:
THOS. McLAUGHLIN,
A. R. MAY.